(12) United States Patent
Nuñez et al.

(10) Patent No.: US 10,797,859 B2
(45) Date of Patent: Oct. 6, 2020

(54) LOW AREA OPTIMIZATION FOR NB-IOT APPLICATIONS

(71) Applicant: Arm Limited, Cambridge (GB)

(72) Inventors: Luis Cavo Nuñez, Zurich (CH);
Sébastien François Roger Fuhrmann, Skane (SE)

(73) Assignee: Arm Limited, Cambridge (GB)

(*) Notice: Subject to any disclaimer, the term of this patent is extended or adjusted under 35 U.S.C. 154(b) by 287 days.

(21) Appl. No.: 15/928,455

(22) Filed: Mar. 22, 2018

(65) Prior Publication Data
US 2019/0296894 A1    Sep. 26, 2019

(51) Int. Cl.
*H04L 9/06* (2006.01)
*G09C 1/00* (2006.01)
*H04W 4/70* (2018.01)
*H04L 29/08* (2006.01)

(52) U.S. Cl.
CPC .............. *H04L 9/0631* (2013.01); *G09C 1/00* (2013.01); *H04L 67/12* (2013.01); *H04L 2209/122* (2013.01); *H04L 2209/80* (2013.01); *H04W 4/70* (2018.02)

(58) Field of Classification Search
CPC .................................................... H04L 9/0631
See application file for complete search history.

(56) References Cited

U.S. PATENT DOCUMENTS

| | | | | |
|---|---|---|---|---|
| 7,796,752 B2* | 9/2010 | Greisas | ................. | H04L 9/0625 380/259 |
| 8,396,209 B2* | 3/2013 | Schneider | ............. | H04L 9/0637 380/28 |
| 9,900,770 B2* | 2/2018 | Wolrich | ................ | H04W 12/02 |
| 2006/0230274 A1* | 10/2006 | Surendran | ............ | H04L 9/0625 713/176 |
| 2008/0232581 A1* | 9/2008 | Elbaz | ...................... | H04L 9/002 380/42 |
| 2011/0291803 A1* | 12/2011 | Bajic | .................. | G08B 13/2462 340/10.1 |
| 2012/0076298 A1* | 3/2012 | Bolotov | ................ | H04L 9/0631 380/255 |
| 2012/0226731 A1* | 9/2012 | Gashkov | ................. | G06F 7/724 708/620 |

(Continued)

OTHER PUBLICATIONS

Advanced Encryption Standard (AES), http://nvlpubs.nist.gov/nistpubs/FIPS/NIST.FIPS.197.pdf, NIST, Nov. 26, 2001.

(Continued)

*Primary Examiner* — Ali Shayanfar
(74) *Attorney, Agent, or Firm* — Leveque IP Law, P.C.

(57) ABSTRACT

An apparatus and methodology for securing data exchanged between devices in a NarrowBand IoT (NB-IoT) environment is disclosed. The apparatus embodies a cryptoprocessor having a confidentiality block and an integrity block. The confidentiality and integrity blocks are coupled to a bus interface through data channels via a multiplexer/demultiplexer (MUX) and first-in-first-out transmitter and receiver. The confidentiality and integrity blocks are further coupled to a cipher block through data channels via a MUX. The cipher block is operable to implement at least one stream cipher and at least one block cipher.

20 Claims, 5 Drawing Sheets

(56) References Cited

U.S. PATENT DOCUMENTS

| | | | | |
|---|---|---|---|---|
| 2014/0079215 | A1* | 3/2014 | Wei | H04L 9/0668 380/46 |
| 2014/0079220 | A1* | 3/2014 | Wei | H04W 12/0013 380/270 |
| 2016/0149696 | A1* | 5/2016 | Winslow | H04L 9/12 380/28 |
| 2017/0048699 | A1* | 2/2017 | Wolrich | G06F 9/30134 |
| 2017/0118637 | A1* | 4/2017 | Peng | H04L 63/205 |
| 2018/0034635 | A1* | 2/2018 | Zhang | H04L 9/0827 |
| 2018/0062843 | A1* | 3/2018 | Gopal | G06F 7/725 |
| 2018/0083972 | A1* | 3/2018 | Kim | H04L 63/205 |
| 2018/0139051 | A1* | 5/2018 | Ghosh | H04L 9/0637 |

OTHER PUBLICATIONS

Specification of the 3GPP Confidentiality and Integrity Algorithms UEA2 & UIA2. Document 1: UEA2 and UIA2 Specification, www.gsma.com/aboutus/wp-content/uploads/2014/12/uea2uia2dlv21. pdf, 3 GPP Task Force, Mar. 19, 2009.
3GPP TS 33.401 Technical Specification, www.3gpp.org/DynaReport/ 33401.htm, 3GPP Task Force, Jun. 2016.
3GPP TS 35.215 Technical Specification, www.3gpp.org/DynaReport/ 35215.htm, 3GPP Task Force, Mar 2017.
3GPP TS 35.221 Technical Specification, www.3gpp.org/DynaReport/ 35221.htm, 3GPP Task Force, Mar. 2017.

\* cited by examiner

Mulα: total 245 iterations
Divα: total 64 iterations

LOW AREA OPTIMIZATION FOR NB-IOT APPLICATIONS

BACKGROUND

The present invention relates generally to wireless communications, and more particularly, to an area efficient cryptoprocessor for securing data compliant with the 3rd Generation Partnership Project (3GPP) standard.

The Internet of Things (IoT) has enabled the deployment of large amounts of interconnected devices that communicate and exchange data. The need to maintain information security is of paramount importance, and as this technology proliferates and the number of access points increase, exploitation by hackers becomes an ever-increasing problem. In addition, the implementation of various security functions to protect such devices and the networks has a negative impact on efficiency. The power consumption associated with executing security protocols presents a significant challenge. IoT devices must be power efficient, and it is highly desirable to power consumption for such battery powered devices.

Successive releases of LTE have optimized Machine-Type Communications (MTC) with improved support for low power wide-area connectivity. In LTE Release 13, enhanced MTC (eMTC) and NarrowBand IoT (NB-IoT) have been introduced. These protocols have enabled a reduction in device cost and complexity, extended battery life and enhanced coverage. NB-IoT provides end-to-end security, which entails trusted security and authentication features. Within the framework of IoT, the cryptographic algorithms for securing sensible data must be adapted to the needs of embedded devices with limited resources, and therefore must meet limited area and power demands. The implementation of these algorithms can be done at both the hardware and software levels. While software implementations enable reuse of resources and support to different cellular standards, these are typically slower and less secure than their hardware counterparts. Furthermore, a processor subsystem in an NB-IoT node would become too overloaded with security processing if implemented as software functions.

Thus, there exists a need for an improved cryptoprocessor that can process the security algorithms such as, for example, SNOW 3G, Advanced Encryption Standard (AES) and ZUC, or any hereinafter developed security algorithms utilized in this context. In this regard, a unified solution can be provided in which the algorithms can share the maximum amount of hardware resources, including a common datapath and common control logic has been identified as the best solution in order to fulfill the low power, low area requirements.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
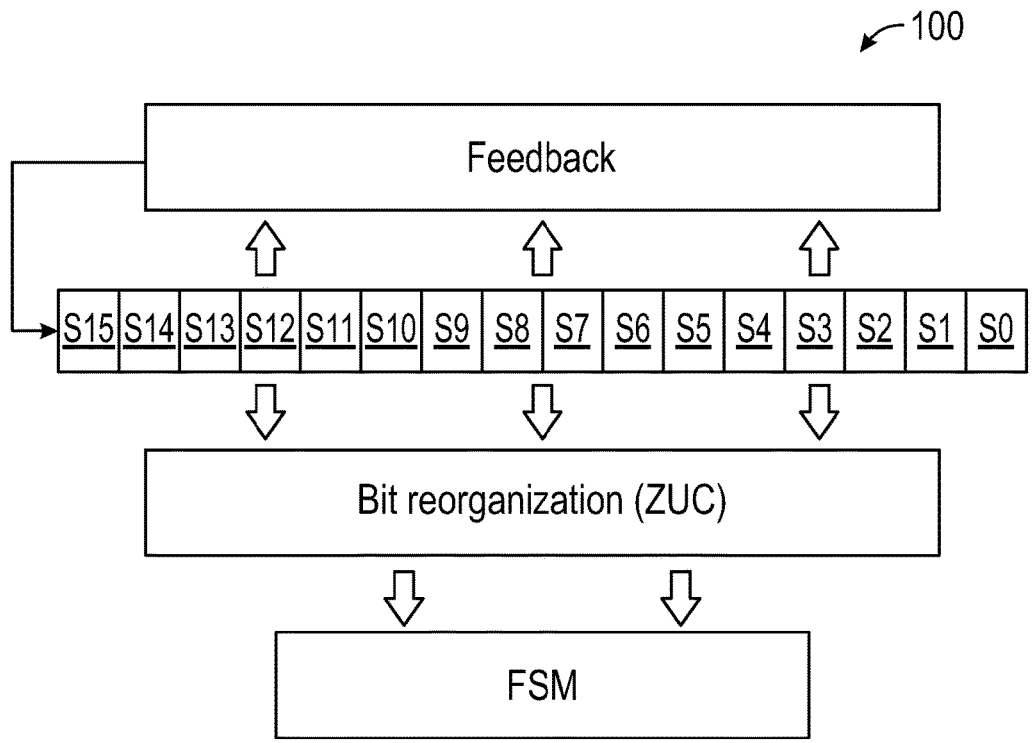
FIG. 1 depicts the primary modules of a keystream generator for 128-EEA1 based on SNOW 3G.

Specific embodiments of the disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more thorough understanding of the disclosure. However, it will be apparent to those skilled in the art that the disclosure may be practiced without these specific details. In other instances, well-known features have not been described in detail to avoid unnecessarily complicating the description.

It is to be understood that the terminology used herein is for the purposes of describing various embodiments in accordance with the present disclosure, and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end. \

In accordance with an embodiment of the present disclosure, there is provided an apparatus for securing data exchanged between devices in an NB-IoT environment. The apparatus embodies a cryptoprocessor having a confidentiality block and an integrity block. The confidentiality and integrity blocks are coupled to a bus interface through data channels via a multiplexer/demultiplexer (MUX) and first-in-first-out transmitter and receiver. The confidentiality and integrity blocks are further coupled to a cipher block through data channels via a MUX. The cipher block is operable to implement SNOW 3G, AES and ZUC.

In accordance with another embodiment, the cipher block includes: an AES cipher block operable to implement an AES encryption algorithm; and a stream cipher block operable to generate keystreams for SNOW 3G and ZUC algorithms.

In accordance with yet another embodiment, the confidentiality block is operable to utilize ciphering cores as keystream generators.

In accordance with still a further embodiment, the confidentiality block is operable to implement a 32-bit XOR operation between two datastreams, a plaintext/ciphertext on a first side thereof, and keystream data on a second side thereof.

In accordance with a further embodiment, the integrity block is operable to produce a 32-bit MAC data word for each of SNOW 3G, AES and ZUC.

In accordance with still another embodiment, the integrity block implements: a SNOW 3G algorithm to iteratively update a value EVAL from a message M and five keystream words produced by a SNOW 3G cipher; and a ZUC algorithm that recursively XORs words from a generated ZUC keystream.

In accordance with yet a further embodiment, a first field operator, MULx, block is iterated to produce a second field operator, MULα, and a third field operator, DIVα.

In accordance with another embodiment, a stream cipher core shares a common 32-bit shift register and control logic between SNOW 3G and ZUC cipher algorithms.

In accordance with another embodiment, there is provided a method for securing data. The method is implemented by a cryptoprocessor having a confidentiality block and an integrity block operably coupled to bus interface and cipher block through a plurality of multiplexers/demultiplexers. The method includes implementing, in the confidentiality block, confidentiality algorithms using ciphering cores as keystream generators, synchronizing plaintext data from a first-in-first-out (FIFO) transmitter (TX), and generating an output datastream to a FIFO receiver (RX). The method further includes implementing, in the integrity block, a SNOW 3G algorithm and iteratively updating a value EVAL from a message M and five keystream words produced by a SNOW 3G cipher;
implementing, in the integrity block, an AES algorithm; and, in the integrity block, recursively XORing words from a generated ZUC keystream and producing MAC data.

The user plane confidentiality and integrity protection mechanisms for LTE systems are defined in Technical Specification System Architecture Evolution (SAE) of 3GPP under the Security Architecture specification. Three Evolved Packet System (EPS) Encryption Algorithms (EEAs) and Integrity Algorithms (EIAs) are defined for the protection of data against malicious attacks: the 128-EEA1 based on SNOW 3G, the 128-EEA2 based on Advanced Encryption Standard (AES) and finally 128-EEA3 based on ZUC ciphering algorithm.

128-EEA1 Snow 3G Algorithm:

The keystream generator for 128-EEA1 is based on SNOW 3G, which is composed of three primary modules 100 as shown in FIG. 1. The keystream produced by the keystream generator is used to mask the plaintext data using an exclusive OR operation. The Linear-Feedback Shift Register (LFSR) initialization is specified in ETSI/SAGE, "Document 1: UEA2 and UIA2 Specification," www.gsma.com/aboutus/wp-content/uploads/2014/12/uea2uia2d1v21.pdf.

128-EEA2 AES Algorithm:

AES is a symmetric block cipher algorithm specified by the National Institute of Standards and Technology (NIST) that processes the input data arranged as a fixed block size of 128 bits. See, NIST, "AdvanceEncryption Standard (AES)," http://nvlpubs.nist.gov/nistpubs/FIPS/NIST.FIPS.197.pdf 2001.

Figure 2:
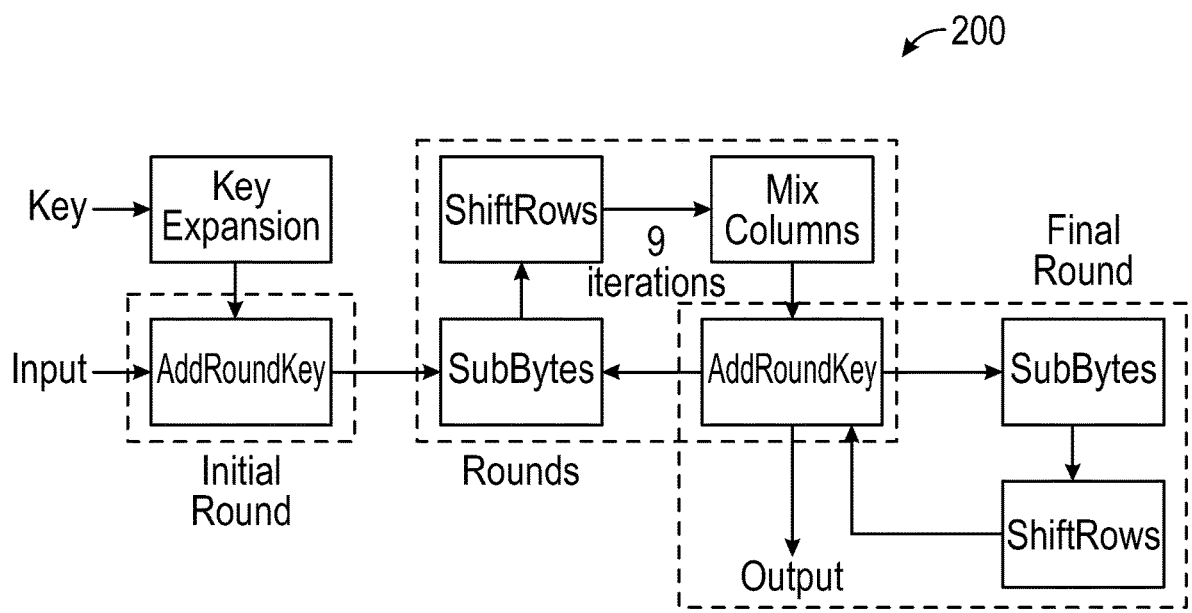
FIG. 2 depicts a representative AES encryption flow.

The principle of operation of AES cipher is to pass a block of data to encrypt, defined as the state, through a network of substitutions and permutations. AES encryption flow 200 is shown in FIG. 2. The 128-EEA2 algorithm uses AES in the Counter (CTR) mode of operation, with a key size of 128 bits. The cipher generates a series of output blocks that are XOR-ed with the input plain text data. AES encryption is performed over a set of input blocks, called counters, which are obtained as specified in Annex B of 3GPP, "Technical Specification TS 33.401: Security Architecture," www.3gpp.org/DynaReport/33401.htm. To recover a plaintext block of data, the same XOR operation is performed between the ciphertext data and the output of the AES cipher, which is obtained using the same counter generated during encryption as an input block.

128-EEA3 ZUC Algorithm:

The keystream generator for 128-EEA3 algorithm has the same general structure as SNOW 3G algorithm shown on FIG. 1, but with different feedback and FSM logic. The LFSR consists of 16 registers of 31 bits each, and the feedback path is constructed by a primitive polynomial in $GF(2^{31}-1)$. This is the primary difference from the SNOW 3G algorithm, since ZUC produces sequences over the prime field $GF(2^{31}-1)$ instead of $GF(2^m)$.

The following algorithms protect the integrity of the information, i.e. to authenticate the data with a Message Authentication Code (MAC) as being the original source of information without any tampered data. The keystream generators described above are used to produce a 32-bit MAC.

128-EIA1 SNOW 3G Based Algorithm:

3GPP's 128-EIA1 algorithm is implemented the same way as ETSI/SAGE UIA2 Integrity algorithm, specified in 3GPP, "Technical Specification TS 35.215: Document 1: UEA2 and UIA2 specifications," www.3gpp.org/DynaReport/35215.htm.

128-EIA2 AES Based Algorithm:

The 128-EIA2 algorithm also uses AES cipher to perform integrity protection. This mode of operation for integrity protection is called Cipher based MAC (CMAC) mode. The message data is divided into blocks of 128 bits, which is the input size of data for the AES keystream generator. The resulting data from the cipher is XOR-ed with the next block of the message and encrypted in another round of AES cipher. This is repeated until all the message has been processed.

128-EIA3 ZUC Based Algorithm:

This algorithm will process the keystreams produced by ZUC stream cipher as specified in to produce an output word MAC. See, 3GPP, "Technical Specification TS 35.221: Document 1: EEA3 and EIA3 specifications," www.3gpp.org/DynaReport/35221.htm.

Figure 3:
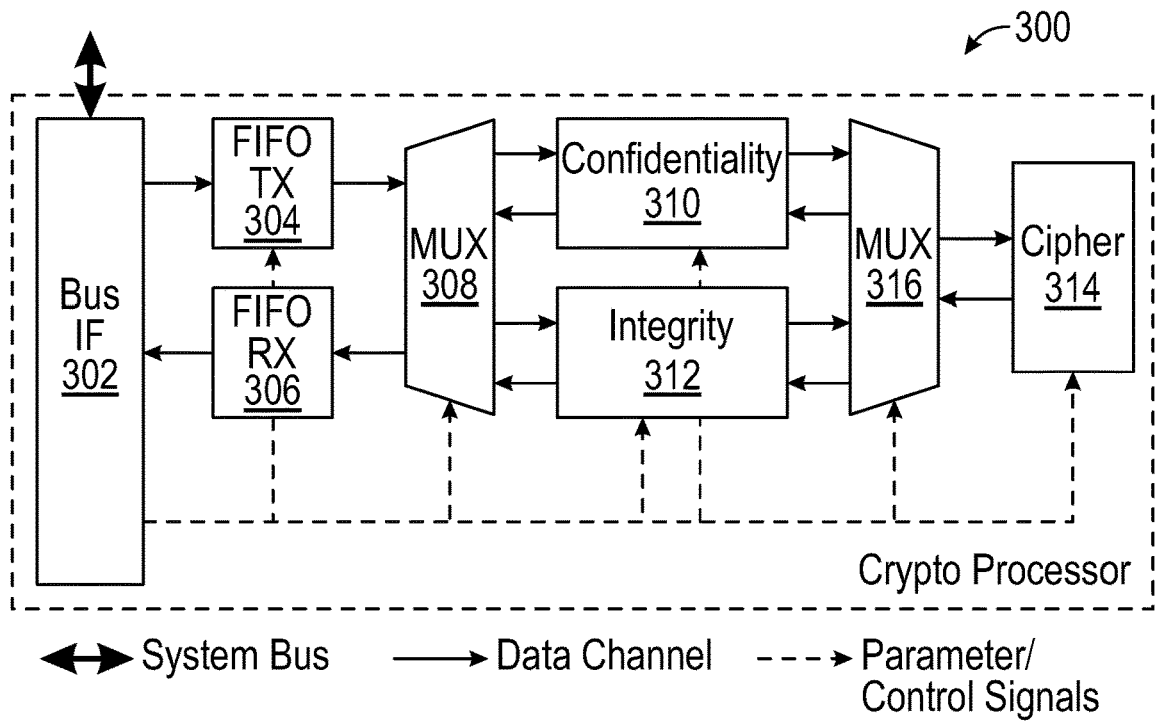
FIG. 3 illustrates a top-level architecture of a cryptoprocessor in accordance with an embodiment of the present disclosure.

Referring now to FIG. 3, there is depicted a top-level architecture of a cryptoprocessor 300 in accordance with an embodiment of the present disclosure. The cryptoprocessor 300 is reconfigurable to support the algorithms and modes described above, and presents the interfacing logic to act as a slave on a system bus to receive and send the necessary data and parameters. The input parameters and control data are received and stored in a register space in a bus interface 302. These are communicated via a first-in-first-out (FIFO) TX 304 and FIFO RX 306 to a multiplexer (MUX) 308, and confidentiality block 310 and integrity block 312. The control data, like the algorithm selector, are utilized to realize the necessary connections in the datapath. A cipher block 314 is operable to execute the algorithms described above, i.e., SNOW 3G, AES, and ZUC cipher. The latter are used as keystream generation cores that feed a keystream to the confidentiality 310 or integrity 312 block, depending on which one is selected. A single cipher algorithm is enabled at a time. The cipher block 314 is coupled to the confidentiality block 310 and integrity block 312 via multiplexer 316.

AES Cipher Block:

The processing core of cipher block 314 implements the AES encryption algorithm. The module is built around an algorithmic state machine that follows the encryption flow detailed for AES ciphering. When the key expansion is realized as an initialization, the resulting expanded key must be stored, occupying a total of 1408 bits. This represents an important area of storage, either as registers or a memory implementation. Since a single-port memory would constrain the throughput of this operation due to its recursiveness (a computed key word need previous results from the same RAM as where the result is written to), instead of storing the expanded key, it is computed on the fly.

Stream Cipher Block:

The combined stream cipher block 314 generates output keystreams for both SNOW 3G and ZUC algorithms. The mode of operation is selected before executing an EEA or EIA algorithm with this block. With the algorithm selected, the LFSR will be initialized accordingly, and the appropriate feedback and FSM blocks are then used.

The confidentiality block 310 contains the necessary logic to implement the 128-EEA confidentiality algorithms using the ciphering cores as keystream generators. The confidentiality block is composed of a 32-bit XOR operation between two data streams, the plaintext/ciphertext on one side, and the keystream data on the other side. The logic is different for the AES algorithm, which uses a counter output concatenated with the confidentiality input parameters as input to AES encryption. The output is then employed as a keystream. This module also synchronizes the plaintext data from the TX FIFO 304 and the keystream data from the cipher 314 to produce an output data stream going into the RX FIFO 306. The three integrity algorithms all produce a 32-bit MAC data word, and they are implemented as independent modules.

Figure 4:
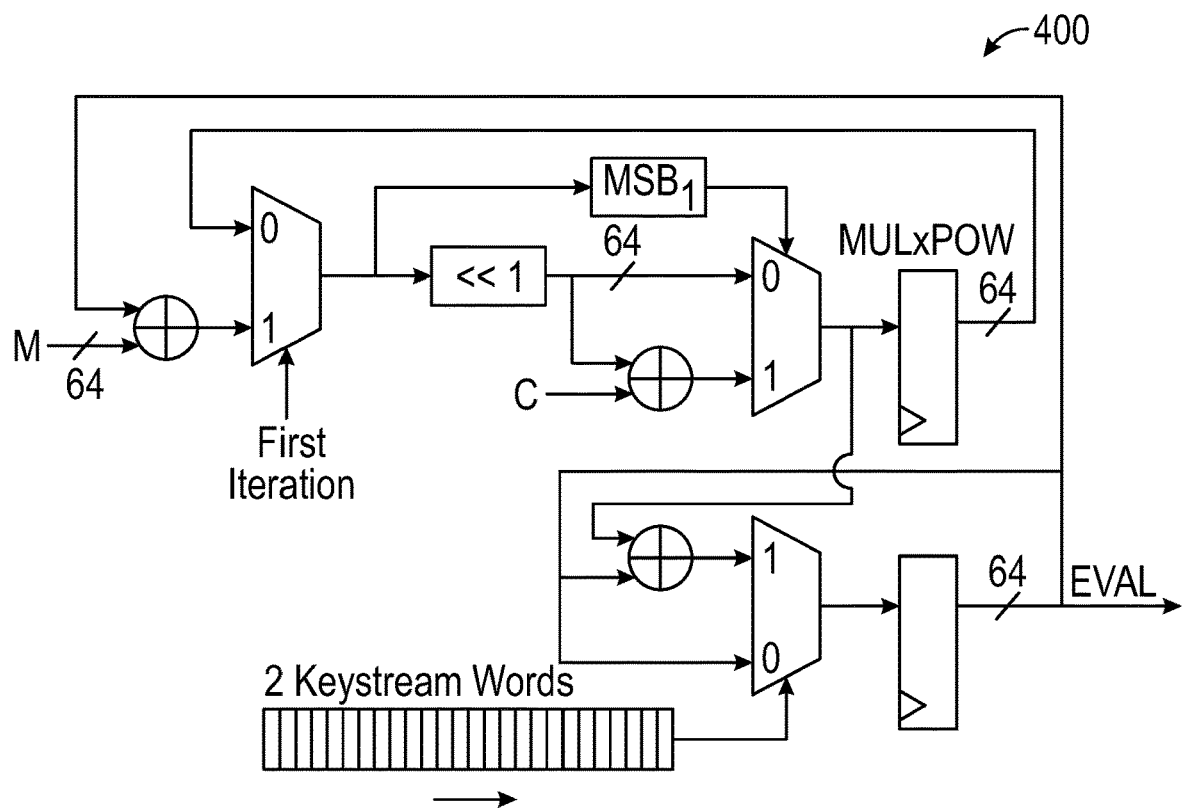
FIG. 4 depicts the detailed hardware logic of a 128-EIA1 integrity block.

128-EIA1 Integrity Block:

This integrity block 312 implements the 128-EIA1 SNOW 3G based algorithm. The operation is based on iteratively updating a value, EVAL, from the received message M and five keystream words produced by the SNOW 3G cipher. FIG. 4 depicts the detailed hardware logic 400 of this operation. For each 64-bit message data, 64 iterations of the operation are realized. The process is repeated until all the message data is consumed.

128-EIA2 Integrity Block:

The 128-EIA2 integrity is implemented in block 312 and predicated on the CMAC mode of the AES algorithm. This block is mainly composed of XOR operations and a FSM that sequences the data communication with the AES cipher.

Figure 5:
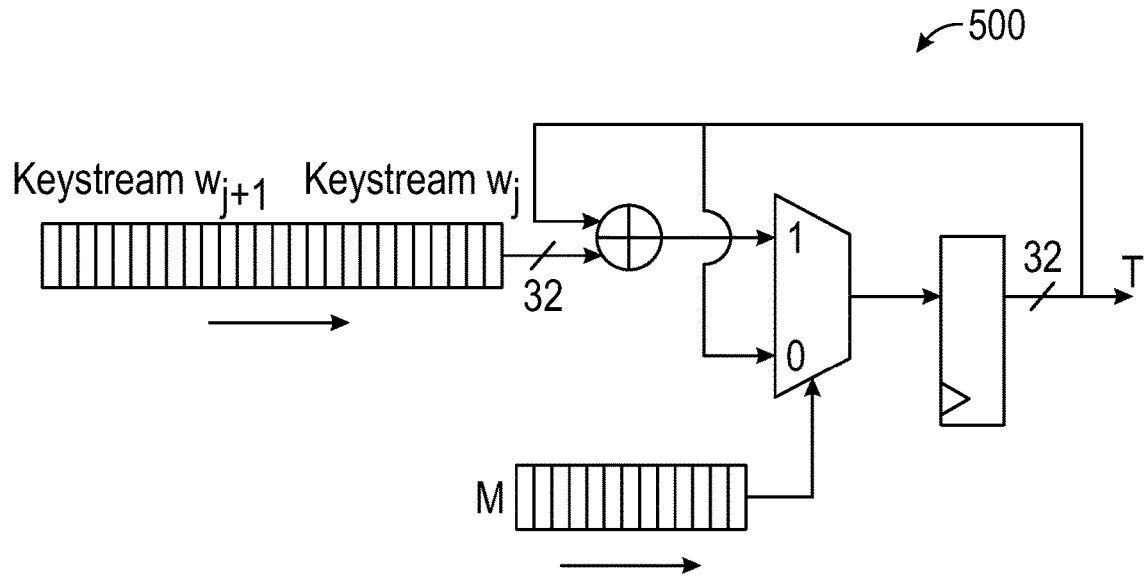
FIG. 5 shows the detailed architecture of a 128-EIA3 integrity block.

128-EIA3 Integrity Block:

This circuit recursively XORs words from the generated ZUC keystream when the bit at the iteration index has a value of '1'. The example architecture 500 implemented for this block is depicted in FIG. 5. A FSM state controls the reception of the next message and keystream words. The process is repeated with the new data. Once the last message word has been received and used, T is XOR-ed two more times with keystream words, without condition. The last value of T is the MAC data that is transmitted.

Area reduction techniques are crucial for NB-IoT applications. In this regard, a High-Level Synthesis (HLS) design flow is employed for exploring the design trade-offs of different architectural solutions. Based on the above, the two stream cipher algorithms that are implemented in accordance with embodiments of the disclosure are very similar in structure. Their similarities in operation include: 1) the control logic for SNOW 3G and ZUC ciphering and the handshake protocol with external modules; and 2) deployment of a shift register with a length of 16 bits in both algorithms (similarly, a 32-bit shift register can be implemented by both algorithms); and 3) common operations of the finite-state machines used in both algorithms.

Figure 6:
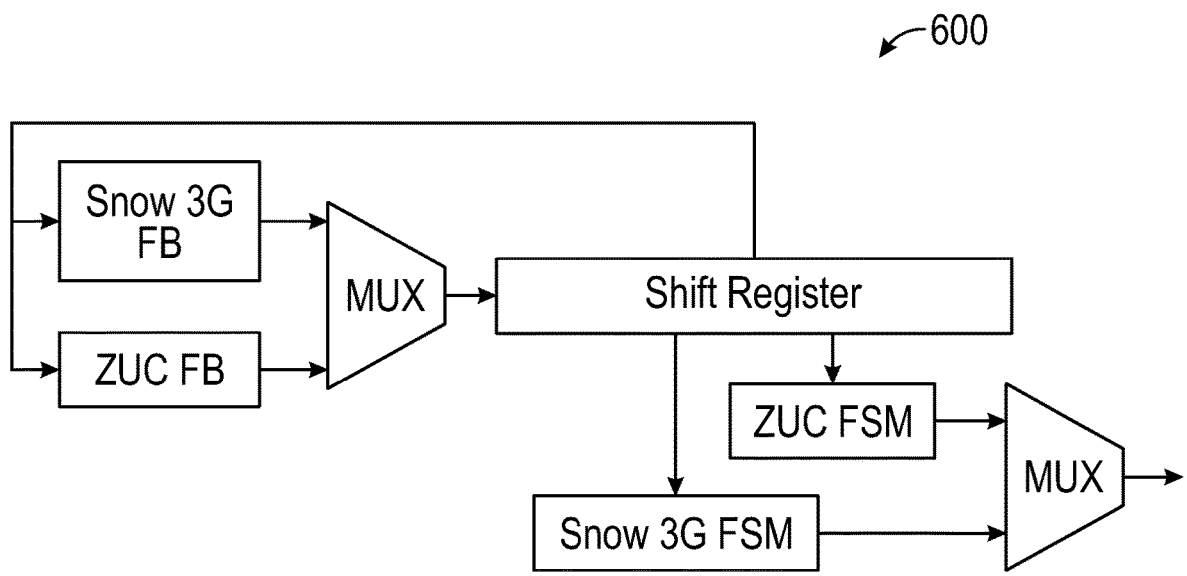
FIG. 6 depicts a combined architecture in which the stream cipher core shares a common 32-bit shift register and control logic between the SNOW 3G and ZUC ciphering algorithm.

Referring now to FIG. 6, there is depicted a combined architecture 600 in which the stream cipher core shares a common 32-bit shift register and control logic between the SNOW 3G and ZUC ciphering algorithm. The size of the FSM is primarily affected by the look-up tables (LUTs) used to perform non-linear substitutions. Since these resources are independent for each algorithm a common FSM does not lead to improved results due to the multiplexing overhead of sharing hardware resources. Finally, the feedback loops perform different operations and are thus maintained independent. The combined architecture exhibits an improvement in the total area as compared to configurations with two separate processing cores.

The LUT implementation is efficient in term of processing time. It is only affected by the latency to obtain a value from a cell. The drawback is the area utilization, particularly sensitive to the input and output data size. On the contrary, the combinational logic does not scale as much as the LUT implementation with the data size but it introduces an increased processing time that mostly depends on the computation complexity. Based on above analysis, we apply different realization schemes for SNOW 3G feedback operators and the S-boxes in all algorithms, depending on their operation characteristics and implementation constraint.

Figure 7:
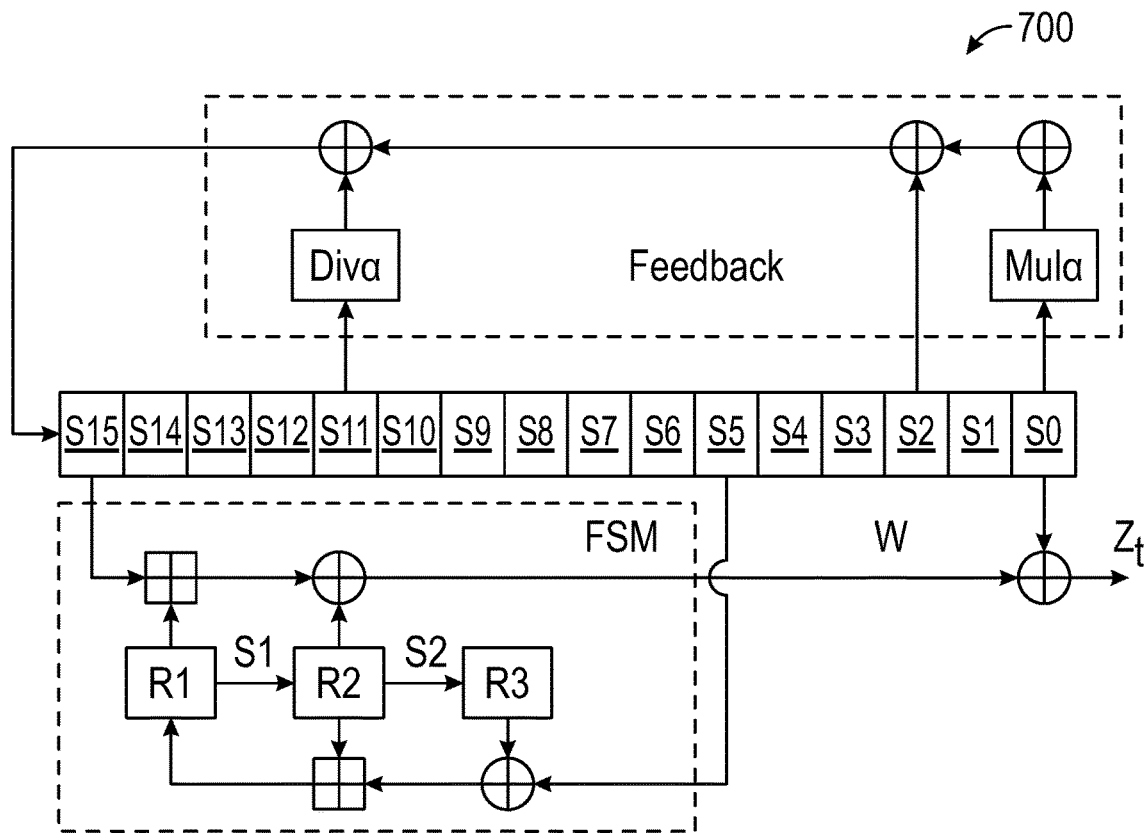
FIG. 7 depicts two field operators—MULα and DIVα—defined in 3GPP's SNOW 3G Specification.

Implementation of SNOW 3G Field Operations:

SNOW 3G feedback presents two field operators MULα and DIVα usually implemented as large LUTs, 8-bits input and 32-bits output, due to computation time constraint. These two operations are defined in 3GPP's SNOW 3G specification and depicted in the schematic 700 of FIG. 7. Both map an 8-bit input to a 32-bit output. They can be implemented as Look-Up Tables (LUT) of 256 32-bit data or as per the following operations:

$$MUL\alpha(c)=MUL \times POW(c,23,0xA9)\|MUL \times POW(c,245, \\ 0xA9)\|MUL \times POW(c,48,0xA9)\|MUL \times \\ POW(c,239,0xA9) \quad\quad\quad (\text{Eq. 1})$$

$$DIV\alpha(c)=MUL \times POW(c,16,0xA9)\|MUL \times POW(c,39, \\ 0xA9)\|MUL \times POW(c,6,0xA9)\|MUL \times POW(c,64, \\ 0xA9) \quad\quad\quad (\text{Eq. 2})$$

In the above equations, c is the 8-bit input data from S0 and S11 to which is applied MULα and DIVα respectively, and II is the concatenation operator. MUL×POW returns 8-bit data, and the 4 MUL×POW outputs are concatenated to form a 32-bit data word; "i" is the number of iterations, "const" is a value defined in as 8-bit hexadecimal constant equals to 0xA9, and "V" is the 8-bit input data of operator MUL×POW. The value of c is passed to this input, << is the binary left shift operator, and MSB(V) returns the most significant bit of V.

The operation MUL×POW(V,i,const) represents a recursive iterative process using the MULx operation defined as follows:
If i equals 0, then
MUL×POW(V,i,const)=V,
Else
MUL×POW(V,i,const)=MULx(MUL×POW(V,i−1,const),const).

And MULx(V,const) defined by: If MSB(V) equals 1, then
MULx(V,const)=(V<<1) XOR const,
Else
MULx(V,const)=(V<<1).

These operations are typically implemented with a LUT in order to achieve a maximum throughput. It is commonly understood by those skilled in the art that a computational method involves four recursive calculations for each block (MULα and DIVα) with a maximum loop iteration of 245. Thus, previous implementations automatically discard this computational method which provides worse area and performance results with respect to the LUT counterpart. When mapped to a LUT, MULα and DIVα occupy 1 kB each. However, this is true in a scenario where a throughput of 1 output every clock cycle is required. This is not the case for NB-IoT devices, which are characterized as low-throughput, low-power and low-area.

Figure 8:
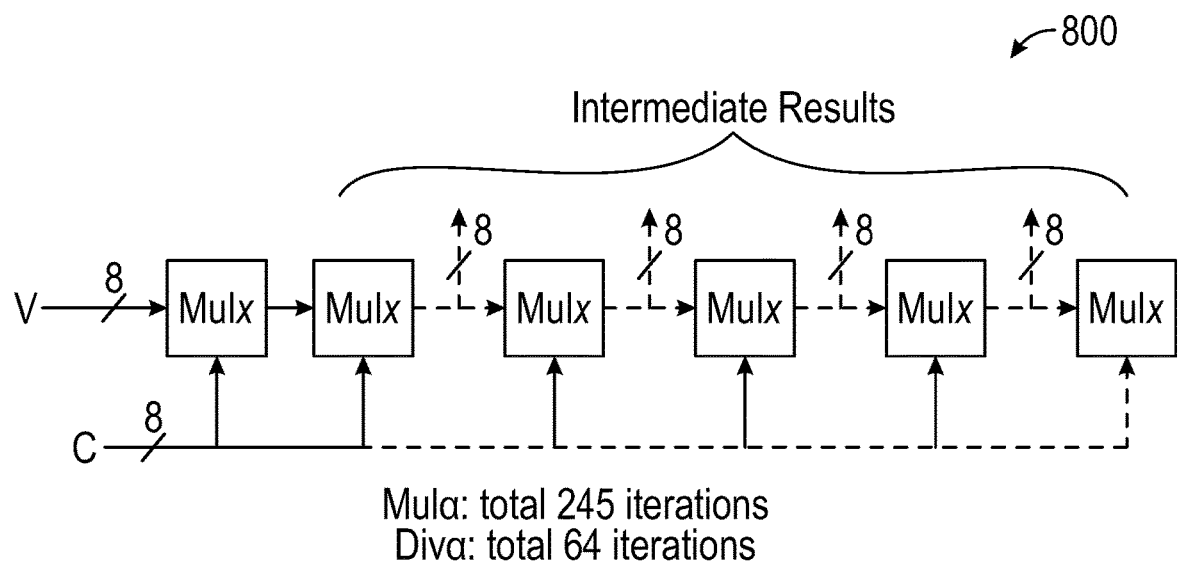
FIG. 8 depicts a logic diagram showing how MULx is iterated to the maximum number of iterations defined for MULα and DIVα.

In accordance with embodiments of the disclosure, it is possible to successfully reduce the successive operations as iterating the MULx operation, i times (second argument of MUL×POW). Moreover, as MUL×POW uses the same input arguments (V and const) in MULα and DIVα, a single loop may be employed for each as shown in the logic diagram 800 of FIG. 8. This loop is iterated to the maximum number of iterations defined for MULα (245) and DIVα (64). Each iteration of MULα and DIVα corresponds to one new MULx block in the drawing. Intermediate results for iterations 23, 48 and 239 are saved on the fly during the iterative process of MULα.

Figure 9:
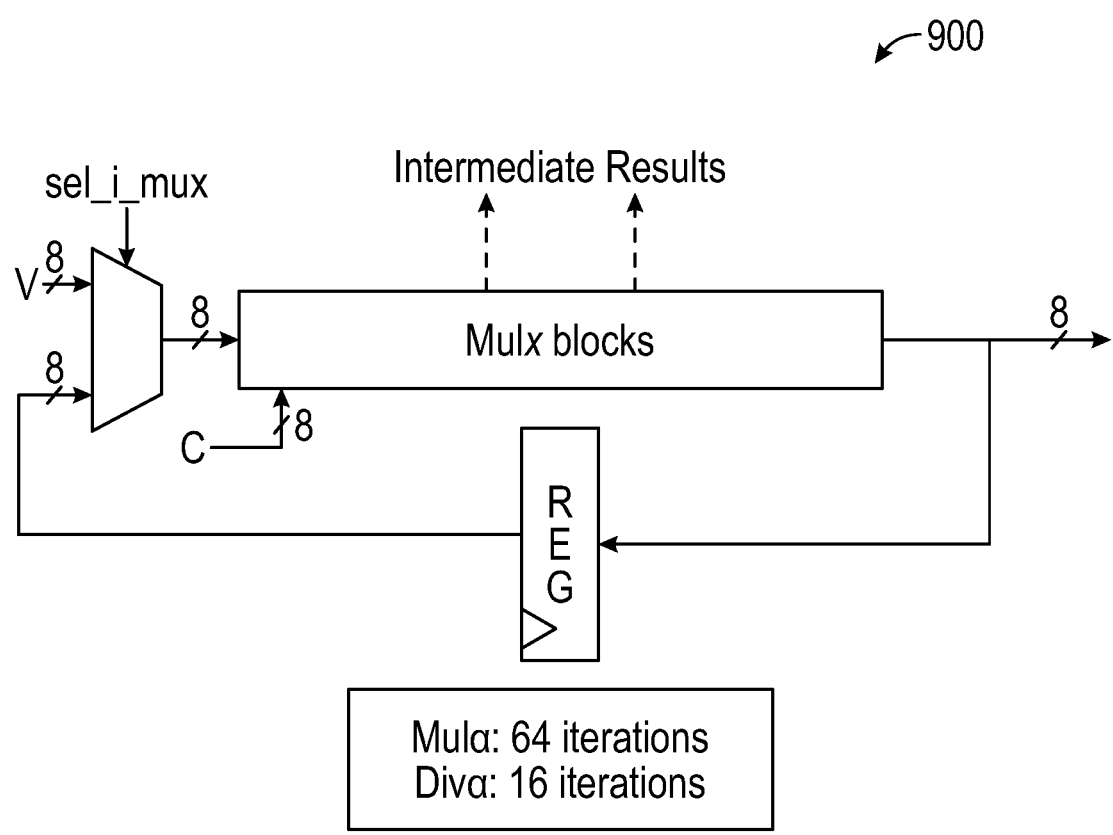
FIG. 9 is a schematic showing how only 64 and 16 iterations of MULx are implemented as blocks for MULα and DIVα respectively, where each is used 4 times to realize all the iterations.

The same is realized for DIVα where the intermediate results for iterations 6, 16 and 39 are stored. Thereafter, the result is rolled by a factor of 4 to achieve a minimum area implementation with a throughput of 1 word every 4 clock cycles as depicted in the schematic 900 of FIG. 9. As a result, only 64 and 16 iterations of MULx are implemented as blocks for MULα and DIVα respectively, where each is used 4 times to realize all the iterations.

In accordance with embodiments of the disclosure, the operators implemented as combinational logic present a significant improvement respect to a generic LUT approach as demonstrated by the following example.

Optimizations for S-Box Implementation:

Rijndael S-box $S_R$ is used in both AES and SNOW 3G algorithms. SNOW 3G uses this substitution box internally in the FSM to compute $S_1$. Four iterations of the S-box $S_R$ are required to produce one output result of $S_1$. On the other hand, AES must perform the subbytes operation, consisting on a S-box $S_R$ substitution, on each byte of the state matrix resulting in a total of 16 calculations. In AES, for all substitutions to be done in parallel, 16 instances of S-box $S_R$ are needed, leading to a majority of the core being occupied by the substitution boxes. In order to improve the gate count of the design, the use of 4 substitution boxes leads to an appreciable reduction in area effort in comparison to using 16 instances of this S-box.

The FSM of SNOW 3G and ZUC each present 32×32 substitution boxes (S-boxes), which contributes to a large area overhead in these blocks. The S-boxes can be implemented following different approaches, generally using a memory, Look-Up Table (LUT) or as combinational logic. In accordance with an embodiment of the disclosure, SNOW 3G uses one instance of Rijndael S-box $S_R$ and one instance of S-box $S_Q$ which will lead to the generation of one output every four clock cycles. Similarly, one instance of S-box $S_0$ and S-box $S_1$ are used in ZUC's FSM in order to reduce the area footprint of this module. An on-the-fly implementation of ZUC S-box $S_0$, presenting a significant area improvement respect a LUT approach, is used to reduce hardware resources.

The cryptoprocessor as disclosed herein has been implemented using 40-nm CMOS technology, with a total gate count of 53.6 kGE. It has been found that an area reduction for both the AES cipher module and the Stream Cipher module can be achieved.

The terms "program," "software application," and the like, as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The present disclosure may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform embodiments of the present disclosure.

Accordingly, embodiments and features of the present disclosure are set out in the following numbered items:

1. A cryptoprocessor, including: a confidentiality block; and an integrity block, the confidentiality and integrity blocks coupled to a bus interface through data channels via a multiplexer/demultiplexer (MUX) and first-in-first-out (FIFO) transmitter (TX) and receiver (RX), the confidentiality and integrity blocks further coupled to a cipher block through data channels via the MUX, the cipher block operable to implement at least one block cipher and at least one stream cipher, and to iterate $MUL\alpha$ and $DIV\alpha$ to produce a new MULx block, the integrity block operable to implement a first stream cipher algorithm to iteratively update a value EVAL from a message M and five keystream words produced by a first keystream, and a second stream cipher algorithm that recursively XORs words from a generated second keystream.

2. The cryptoprocessor of item 1, where the cipher block is operable to implement SNOW 3G, AES and ZUC.

3. The cryptoprocessor of item 1, where the cipher block includes: an AES cipher block operable to implement an AES encryption algorithm; and a stream cipher block operable to generate keystreams for SNOW 3G and ZUC algorithms.

4. The cryptoprocessor of item 1, where the confidentiality block is operable to utilize ciphering cores as keystream generators.

5. The cryptoprocessor of item 4, where the confidentiality block is operable to implement a 32-bit XOR operation between two datastreams, a plaintext/ciphertext on a first side thereof, and keystream data on a second side thereof.

6. The cryptoprocessor of item 2, where the integrity block is operable to produce a 32-bit MAC data word for each of SNOW 3G, AES and ZUC.

7. The cryptoprocessor of item 1, where a stream cipher core shares a common 32-bit shift register and control logic between SNOW 3G and ZUC cipher algorithms.

8. A cryptoprocessor, including: a confidentiality block; and an integrity block operable to produce a 32-bit MAC data word for each of at least one block cipher and at least one stream cipher, the confidentiality and integrity blocks coupled to a bus interface through data channels via a multiplexer/demultiplexer (MUX) and first-in-first-out (FIFO) transmitter (TX) and receiver (RX), the confidentiality and integrity blocks further coupled to a cipher block through data channels via the MUX, the cipher block operable to implement at least one block cipher and at least one stream cipher, and to iterate MULα and DIVα to produce a new MULx block, the integrity block operable to implement a first stream cipher algorithm to iteratively update a value EVAL from a message M and five keystream words produced by a first keystream, and a second stream cipher algorithm that recursively XORs words from a generated second keystream.

9. The cryptoprocessor of item 8, where the ciphers are SNOW 3G, AES and ZUC.

10. The cryptoprocessor of item 8, where a stream cipher core shares a common 32-bit shift register and control logic between SNOW 3G and ZUC cipher algorithms.

11. The cryptoprocessor of item 8, where the cipher block comprises:
an AES cipher block operable to implement an AES encryption algorithm; and a stream cipher block operable to generate keystreams for SNOW 3G and ZUC algorithms.

12. The cryptoprocessor of item 8, where the confidentiality block is operable to utilize ciphering cores as keystream generators.

13. The cryptoprocessor of item 12, where the confidentiality block is operable to implement a 32-bit XOR operation between two datastreams, a plaintext/ciphertext on a first side thereof, and keystream data on a second side thereof.

14. The cryptoprocessor of item 9, where the integrity block is operable to produce a 32-bit MAC data word for each of SNOW 3G, AES and ZUC.

15. A method of securing data, including: in a cryptoprocessor having a confidentiality block and an integrity block operably coupled to a bus interface and cipher block through a plurality of multiplexers and demultiplexers: implementing, in the confidentiality block, confidentiality algorithms using ciphering cores as keystream generators, synchronizing plaintext data from a first-in-first-out (FIFO) transmitter (TX), and generating an output datastream to a FIFO receiver (RX); in the cipher block, iterating MULα and DIVα to produce a new MULx block; implementing, in the integrity block, a first keystream algorithm and iteratively updating a value EVAL from a message M and five keystream words produced by a stream cipher; implementing, in the integrity block, a block cipher algorithm; and in the integrity block, recursively XORing words from a generated second keystream and producing MAC data.

16. The method of item 15, where the first keystream algorithm and stream cipher are Snow 3G, the block cipher algorithm is AES, and the generated second keystream is ZUC.

17. The method of item 15, where the cipher block includes: an AES cipher block operable to implement an AES encryption algorithm; and a stream cipher block operable to generate keystreams for SNOW 3G and ZUC algorithms.

18. The method of item 15, where the confidentiality block is operable to utilize ciphering cores as keystream generators.

19. The method of item 18, where the confidentiality block is operable to implement a 32-bit XOR operation between two datastreams, a plaintext/ciphertext on a first side thereof, and keystream data on a second side thereof.

20. The method of item 16, where the integrity block is operable to produce a 32-bit MAC data word for each of SNOW 3G, AES and ZUC.

In accordance with the foregoing, a novel apparatus and method for securing data exchanged between devices in an NB-IoT environment is disclosed. Having thus described the invention of the present application in detail and by reference to embodiments thereof, it will be apparent that modifications and variations are possible without departing from the scope of the invention defined in the appended claims as follows:

We claim:

1. A cryptoprocessor for securing data exchanged between devices, comprising:
a confidentiality block, configurable to implement an XOR operation between two datastreams;
an integrity block, configurable to implement a first stream cipher algorithm to iteratively update, at each bit of a message, a value from the message and five keystream words produced by a first keystream, and a second stream cipher algorithm that recursively XORs words from a second keystream; and
a cipher block, configurable to implement at least one block cipher and at least one stream cipher, and to iterate a first field operator block to produce a second field operator and a third field operator of the at least one stream cipher, the cipher block further configurable to generate the first keystream and the second keystream,
the confidentiality and integrity blocks coupled to a bus interface through data channels via a multiplexer/demultiplexer (MUX) and first-in-first-out (FIFO) transmitter (TX) and receiver (RX),
the confidentiality and integrity blocks further coupled to the cipher block through data channels via the MUX.

2. The cryptoprocessor of claim 1, where the cipher block is configurable to implement SNOW 3G, AES and ZUC.

3. The cryptoprocessor of claim 2, where the integrity block is configurable to produce a 32-bit MAC data word for each of SNOW 3G, AES and ZUC.

4. The cryptoprocessor of claim 1, where the cipher block comprises:
an AES cipher block configurable to implement an AES encryption algorithm; and
a stream cipher block configurable to generate keystreams for SNOW 3G and ZUC algorithms.

5. The cryptoprocessor of claim 1, where the confidentiality block is configurable to utilize ciphering cores as keystream generators.

6. The cryptoprocessor of claim 5, where the confidentiality block is configurable to implement a 32-bit XOR operation between two datastreams, a plaintext/ciphertext on a first side thereof, and keystream data on a second side thereof.

7. The cryptoprocessor of claim 1, where a stream cipher core shares a common 32-bit shift register and control logic between SNOW 3G and ZUC cipher algorithms.

8. A cryptoprocessor for authenticating and securing data, comprising:
a confidentiality block, configurable to implement an XOR operation between two datastreams;
an integrity block, configurable to produce a 32-bit MAC data word for each of at least one block cipher and at least one stream cipher, and configurable to implement a first stream cipher algorithm to iteratively update, at each bit of a message, a value from the message and five keystream words produced by a first keystream, and a second stream cipher algorithm that recursively XORs words from a second keystream; and a cipher block, configurable to implement at least one block cipher and at least one stream cipher, and to iterate a first field operator block to produce a second field operator and a third field operator of the at least one stream cipher, the cipher block further configurable to generate the first keystream and the second keystream, the confidentiality and integrity blocks coupled to a bus interface through data channels via a multiplexer/demultiplexer (MUX) and first-in-first-out (FIFO) transmitter (TX) and receiver (RX), the confidentiality and integrity blocks further coupled to the cipher block through data channels via the MUX.

9. The cryptoprocessor of claim 8, where the ciphers are SNOW 3G, AES and ZUC.

10. The cryptoprocessor of claim 9, where the integrity block is configurable to produce a 32-bit MAC data word for each of SNOW 3G, AES and ZUC.

11. The cryptoprocessor of claim 8, where a stream cipher core shares a common 32-bit shift register and control logic between SNOW 3G and ZUC cipher algorithms.

12. The cryptoprocessor of claim 8, where the cipher block comprises:
an AES cipher block configurable to implement an AES encryption algorithm; and
a stream cipher block configurable to generate keystreams for SNOW 3G and ZUC algorithms.

13. The cryptoprocessor of claim 8, where the confidentiality block is configurable to utilize ciphering cores as keystream generators.

14. The cryptoprocessor of claim 13, where the confidentiality block is configurable to implement a 32-bit XOR operation between two datastreams, a plaintext/ciphertext on a first side thereof, and keystream data on a second side thereof.

15. A method of securing data, comprising:
in a cryptoprocessor having a confidentiality block and an integrity block operably coupled to a bus interface and cipher block through a plurality of multiplexers and demultiplexers:

implementing, in the confidentiality block, confidentiality algorithms using ciphering cores as keystream generators, synchronizing plaintext data from a first-in-first-out (FIFO) transmitter (TX), and generating an output datastream to a FIFO receiver (RX);

in the cipher block, iterating a first field operator block to produce a second field operator and a third field operator of at least one stream cipher, and generating a first keystream and a second keystream;

implementing, in the integrity block, a first keystream algorithm and iteratively updating, at each bit of a message, a value from a message and five keystream words produced by the first keystream of the at least one stream cipher;

implementing, in the integrity block, a block cipher algorithm; and in the integrity block, recursively XORing words from the second keystream and producing MAC data.

16. The method of claim 15, where the first keystream algorithm and stream cipher are Snow 3G, the block cipher algorithm is AES, and the second keystream is ZUC.

17. The method of claim 16, where the integrity block is configurable to produce a 32-bit MAC data word for each of SNOW 3G, AES and ZUC.

18. The method of claim 15, where the cipher block comprises:
an AES cipher block configurable to implement an AES encryption algorithm; and
a stream cipher block configurable to generate keystreams for SNOW 3G and ZUC algorithms.

19. The method of claim 15, where the confidentiality block is configurable to utilize ciphering cores as keystream generators.

20. The method of claim 19, where the confidentiality block is configurable to implement a 32-bit XOR operation between two datastreams, a plaintext/ciphertext on a first side thereof, and keystream data on a second side thereof.

* * * * *